(12) United States Patent
Zhang et al.

(10) Patent No.: US 11,886,554 B1
(45) Date of Patent: Jan. 30, 2024

(54) METHOD FOR PROTECTING DEEP LEARNING MODEL BASED ON CONFIDENTIAL COMPUTING

(71) Applicant: Nanhu Laboratory, Jiaxing (CN)

(72) Inventors: Lei Zhang, Jiaxing (CN); Wensheng Tian, Jiaxing (CN)

(73) Assignee: Nanhu Laboratory, Jiaxing (CN)

(*) Notice: Subject to any disclaimer, the term of this patent is extended or adjusted under 35 U.S.C. 154(b) by 0 days.

(21) Appl. No.: 18/115,257

(22) Filed: Feb. 28, 2023

(30) Foreign Application Priority Data

Sep. 5, 2022 (CN) .......................... 202211076002.X

(51) Int. Cl.
| | |
|---|---|
| *G06F 21/12* | (2013.01) |
| *G06F 21/60* | (2013.01) |
| *G06N 3/08* | (2023.01) |
| *G06F 21/10* | (2013.01) |

(52) U.S. Cl.
CPC .......... *G06F 21/121* (2013.01); *G06F 21/602* (2013.01); *G06N 3/08* (2013.01); *G06F 21/1015* (2023.08)

(58) Field of Classification Search
CPC ................. G06F 21/121; G06F 21/602; G06F 2221/0713; G06F 21/1015; G06N 3/08
See application file for complete search history.

(56) References Cited

U.S. PATENT DOCUMENTS

| | | | |
|---|---|---|---|
| 2022/0286272 A1* | 9/2022 | Wang | ........................ G06N 3/10 |
| 2023/0168932 A1* | 6/2023 | Rafferty | .............. G06F 21/6245 718/104 |

OTHER PUBLICATIONS

Notice of Grant in Cn Application No. 202211076002.X, dated Oct. 18, 2022.

* cited by examiner

*Primary Examiner* — Philip J Chea
*Assistant Examiner* — Sangseok Park
(74) *Attorney, Agent, or Firm* — Occhiuti & Rohlicek LLP

(57) ABSTRACT

The present invention discloses a method for protecting a deep learning model based on confidential computing. In this solution, a use process of a deep learning model is divided into two stages: Data preprocessing and inference. At the data preprocessing stage, a data preprocessing model is mainly used to process inference data of an authorized user. The data preprocessing model is a lightweight processing module, which occupies less computing resources, and the data preprocessing model is deployed in a confidential computing environment. At the inference stage, an inference model is used to perform inference on preprocessed data, and the inference model is deployed in a common computing environment. In the entire process, copyright attestation of the deep learning model can be implemented without affecting inference accuracy of the model, and the infringement of the model copyright can be effectively resisted through model forgery, transfer learning, knowledge distillation, and the like.

7 Claims, 4 Drawing Sheets

METHOD FOR PROTECTING DEEP LEARNING MODEL BASED ON CONFIDENTIAL COMPUTING

CROSS-REFERENCE TO RELATED APPLICATION

This patent application claims the benefit and priority of Chinese Patent Application No. 202211076002.X, filed with the China National Intellectual Property Administration on Sep. 05, 2022, the disclosure of which is incorporated by reference herein in its entirety as part of the present application.

TECHNICAL FIELD

The present invention belongs to a deep learning model protection technology, and in particular, to a method for protecting a deep learning model based on confidential computing.

BACKGROUND

Deep learning models have been widely used in the fields of autopilot, face recognition, biomedicine, and the like. Training a high-precision deep learning model requires a large amount of resources such as a large amount of human resources for labeling a data set, and a large amount of computing resources needs to be also consumed during training. The high-precision deep learning model has become a high-value intellectual property.

Existing deep learning model protection methods are mainly based on watermark attestation. Through these methods, a watermark that can be verified by a model copyright owner is embedded into a model by processing a model parameter or a training data set. In this way, after a model copyright is infringed, the model copyright can be verified by reading information about the watermark. However, to attest the model by using the watermark requires access to the model. Unauthorized users can restrict the model copyright owner to attest the model by hiding access to the model. In addition, the unauthorized users can also remove the information about the watermark in the model by using methods such as model pruning, model migration, and knowledge distillation.

At present, the deep learning model is still protected by encrypting the entire deep learning model, encrypting a weight parameter of a part of the deep learning model, and performing permutation and confusion on the weight information of the deep learning model. However, in these methods, a decryption key of the model needs to be given to the authorized user when the model is used by the authorized user. When the decryption key of the model is given to the authorized user, the model copyright owner cannot effectively supervise the scope of the model. A model user may distribute and replicate the model outside the authorization scope.

Because useful knowledge can be extracted from an original deep learning model through knowledge distillation, Ma et al. think that training a student model through knowledge distillation can make the performance of the student model reach or even exceed the performance of a teacher model, and this model training mode will also infringe the intellectual property rights of the teacher model. All existing model protection methods based on watermarking, model encryption, and model weight information permutation and confusion ignore an indirect infringement mode that the authorized user trains the student model based on the existing model by using the knowledge distillation technology, to improve inference accuracy of the student model. Specifically, the authorized user trains the student model by using a protected model as the teacher model and by using the knowledge distillation technology, to improve the inference accuracy of the student model. The high-precision student model can be deployed in an actual service, which can easily bypass the deep learning model protection method based on watermarking, model encryption, and model weight information permutation and confusion.

Based on the foregoing, the existing deep learning model protection solution still has the following problems:

(1) Model copyright attestation is difficult. The watermark-based method needs to satisfy a white-box attestation condition or a black-box attestation condition to attest the deep learning model. If the attestation condition is not met, the model copyright owner cannot attest the model. In addition, in the method for protecting the deep learning model by watermarking, the model copyright can only be passively verified, and a user who steals the model cannot be restricted to use the deep learning model for inference.

(2) Protection of confidential information is difficult. In the manner based on encryption and confusion, both the model copyright owner and the authorized user of the model need to deal with the leakage risk of a decryption key or a confusion key. If the authorized user of the model actively shares the model and the key to the unauthorized user, it will lead to the loss of the interests of the model copyright owner. The authorized user of the model also faces the risk of key loss or theft when using and saving the model and the key. The application scenarios of the deep learning model are becoming more diversified, which brings more unknown risks to model deployment and key protection.

(3) Model protection is not comprehensive. The existing deep learning model protection methods can only deal with some attacks or theft means, and the model protection is not comprehensive. In addition, in the current deep learning model protection method, attestation information (the watermark or the key) is closely associated with the published model. After the model is sent to a user, the model copyright owner loses the condition for copyright attestation and cannot effectively manage the application scope of the model copyright setting.

SUMMARY

In view of the foregoing problems, an objective of the present invention is to provide a method for protecting a deep learning model based on confidential computing. A use process of a deep learning model is divided into two stages: Data preprocessing and inference. At the data preprocessing stage, a data preprocessing model is mainly used to process inference data of an authorized user. The data preprocessing model is a lightweight processing module, which occupies less computing resources, and the data preprocessing model is deployed in a confidential computing environment. At the inference stage, an inference model is used to inference the preprocessed data, and the inference model is deployed in a common computing environment. In the entire process, copyright attestation of the deep learning model can be implemented without affecting inference accuracy of the model, and the infringement of the model copyright can be effectively resisted through model forgery, transfer learning, knowledge distillation, and the like.

In order to achieve the above-mentioned objective, the present invention employs the following technical solutions:

A method for protecting a deep learning model based on confidential computing is provided, where a preprocessing module having a data preprocessing model and an inference module having an inference model are included, and the data preprocessing model is encrypted and deployed into a confidential computing environment; and the method includes:

S1: starting the preprocessing module in the confidential computing environment, and sending attestation information of the confidential computing environment to a model copyright owner server;

S2: receiving a attestation result returned by the model copyright owner server, and obtaining a decryption key for decrypting the data preprocessing model if the attestation result is correct, or exiting running if the attestation result is incorrect;

S3: decrypting the data preprocessing model by using the obtained decryption key, where the preprocessing module loads the decrypted data preprocessing model;

S4: preprocessing, by the data preprocessing model, to-be-inferred data submitted by an authorized user, and sending the preprocessed data to the inference model; and S5: performing, by the inference model, inference on the received preprocessed data, and then sending an inference result to the authorized user.

In the method for protecting a deep learning model based on confidential computing, in step S5, before the inference model is used, a model parameter is first loaded and the model is initialized; and the preprocessing module includes a confidential computing environment initialization module, and in step S1, the confidential computing environment initialization module is started in the confidential computing environment, and the confidential computing environment initialization module sends the attestation information of the confidential computing environment to the model copyright owner server; and in step S3, the confidential computing environment initialization module loads the decrypted data preprocessing model.

In the method for protecting a deep learning model based on confidential computing, the inference model is deployed in a common computing environment.

In the method for protecting a deep learning model based on confidential computing, the preprocessing module and the inference module are distributed to the authorized user in advance and are deployed on an authorized user end.

In the method for protecting a deep learning model based on confidential computing, the preprocessing module and the inference module are distributed to the authorized user in the following manners:

encrypting a trained data preprocessing model by using an encryption algorithm;

packaging the encrypted data preprocessing model and preprocessing code as the preprocessing module;

packaging a trained inference model and inference code as the inference module;

distributing the preprocessing module and the inference module to the authorized user; and deploying, by the authorized user, the preprocessing module to the confidential computing environment and deploying the inference module to a common computing environment.

In the method for protecting a deep learning model based on confidential computing, in step S1 and step S2, the model copyright owner server verifies security of the confidential computing environment and integrity of the preprocessing module for the authorized user based on a remote attestation mechanism of the confidential computing environment, if a attestation result is safety and complete, the attestation result including the decryption key is returned to the confidential computing environment, and the attestation result is correct in this case; otherwise, the attestation result including no decryption key is returned, and the attestation result is incorrect in this case.

In the method for protecting a deep learning model based on confidential computing, a training method of the data preprocessing model includes:

running the data preprocessing model and a pretraining model, randomizing parameter information in the models, and combining loss functions of the data preprocessing model and the pretraining model;

processing a data set by using the data preprocessing model, and sending preprocessed data to the pretraining model;

sending unprocessed original data to the pretraining model; and training the pretraining model by using the original data and the preprocessed data, and selecting a combination of the data preprocessing model and the pretraining model with highest prediction accuracy.

In the method for protecting a deep learning model based on confidential computing, a training method of the inference model includes:

running the trained data preprocessing model and the pretraining model, and fixing model parameter information;

running the inference model and setting an optimizer;

processing the data set by using the data preprocessing model;

sending the preprocessed data to the pretraining model and the inference model respectively, and sending the unprocessed original data to the inference model; and training the inference model by using the original data and the preprocessed data, and optimizing a parameter of the inference model by using a prediction result of the pretraining model.

In the method for protecting a deep learning model based on confidential computing, the data preprocessing model and the pretraining model share one loss function during training.

In the method for protecting a deep learning model based on confidential computing, the inference model and the pretraining model have a same network structure.

The present invention has the following advantages:

This solution introduces the confidential computing environment to protect the deep learning model, and the intellectual property right protection of the deep learning model is implemented by providing a high-precision inference result to only the authorized user.

This solution allows the inference model to be distributed to the authorized user for deployment, even if an unauthorized user obtains the inference model, the high-precision inference result cannot be obtained from the model, and the security of the model copyright and the flexibility of the user deployment can be ensured.

The copyright attestation of the deep learning model can be implemented without affecting the model inference precision, and the infringement of the model copyright can be effectively resisted by means of model forgery, transfer learning, knowledge distillation, and the like.

This solution has a faster inference speed than that in a solution in which model inference is performed in the confidential computing environment, and can protect the copyright security of the deep learning model to the greatest extent compared with a solution in which the inference model runs in only a CPU.

DETAILED DESCRIPTION OF THE EMBODIMENTS

The present invention will be further described in detail below with reference to the accompanying drawings and specific implementations.

This solution provides a method for protecting a deep learning model based on confidential computing. In the method, a model is divided into two parts of a data preprocessing model and an inference model. A model copyright owner trains the data preprocessing model and the inference model and then distributes the data preprocessing model and the inference model to an authorized user, and the authorized user obtains a high-precision inference result calculated through a complete model based on a confidential computing method.

A training process of the deep learning model is as follows.

Figure 1:
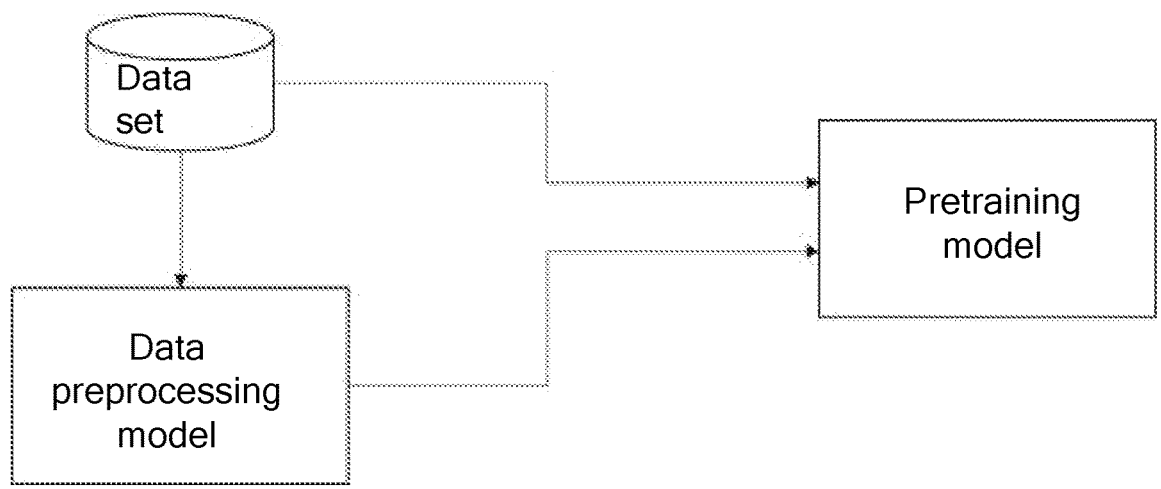
FIG. 1 is a schematic training diagram of a data preprocessing model and a pretraining model according to the present invention.

As shown in FIG. 1, a data preprocessing model and a pretraining model are trained:

(1) Run the data preprocessing model and the pretraining model, randomize parameter information in the models, and combine loss functions of the data preprocessing model and the pretraining model, where the pretraining model has a same network structure as the inference model.

(2) Process a data set by using the data preprocessing model, and send preprocessed data to the pretraining model.

(3) Send unprocessed original data to the pretraining model.

(4) Train the pretraining model by using the original data and the preprocessed data, and select a combination of the data preprocessing model and the pretraining model with highest prediction accuracy.

Preferably, when the data preprocessing model and the pretraining model are trained, the two models share one loss function.

Figure 2:
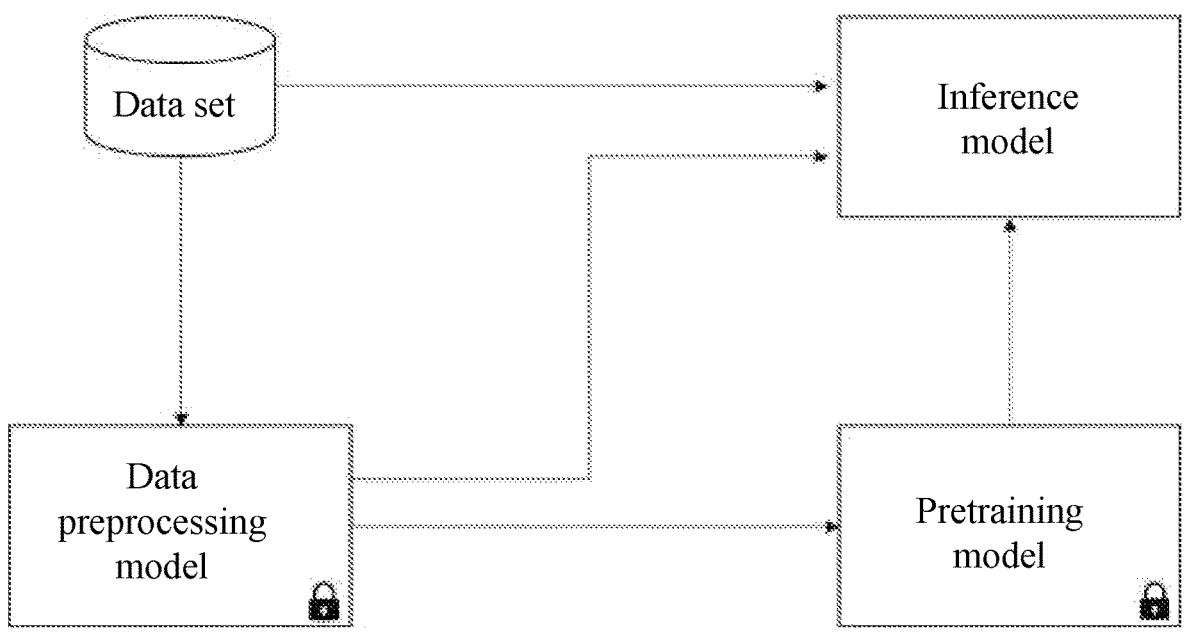
FIG. 2 is a schematic diagram of training an inference model according to the present invention.

As shown in FIG. 2, the inference model is trained.

(1) Construct an inference mode, where the inference model and the pretraining model use a same network structure.

(2) Run the trained data preprocessing model and the pretraining model, and fix model parameter information.

(3) Run the inference model and set an optimizer.

(4) Process the data set by using the data preprocessing model.

(5) Send the preprocessed data to the pretraining model and the inference model respectively, and send the unprocessed original data to the inference model.

(6) Train the inference model by using the original data and the preprocessed data, and optimize a parameter of the inference model by using a prediction result of the pretraining model.

When the inference model is trained, the parameter information of the data preprocessing model and the parameter information of the pretraining model are fixed, and when the optimizer performs gradient update, only the parameter information of the inference model is updated.

Figure 3:
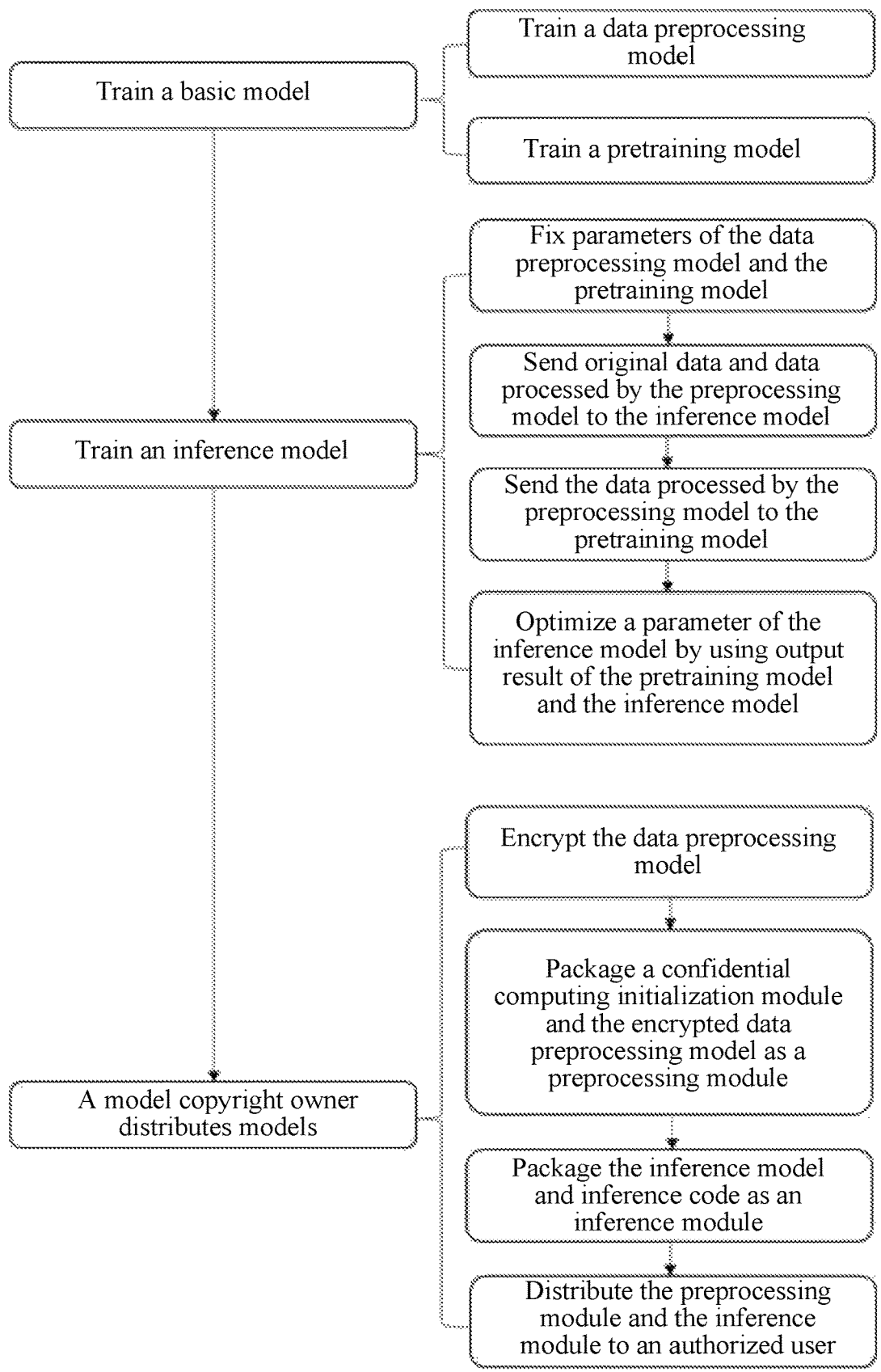
FIG. 3 is a work flowchart of a model copyright owner side when the present invention is implemented.

As shown in FIG. 3, the model copyright owner trains the data preprocessing model and the inference model and then distributes the data preprocessing model and the inference model to the authorized user.

(1) Encrypt the trained data preprocessing model by using a safety encryption algorithm (for example, advanced encryption standard (AES) or SM1).

(2) Package the encrypted data preprocessing model and preprocessing code as a preprocessing module, where the data preprocessing model refers to a model file including weight information of the data preprocessing model, and the preprocessing code includes code for all other functions of the preprocessing module, for example, a confidential computing environment initialization module. This part of the module cannot be changed by the authorized user. When the authorized user runs the preprocessing module in the confidential computing environment, a copyright owner server verifies security of the confidential computing environment and integrity of the preprocessing module for the authorized user through a remote authentication mechanism of the confidential computing environment. If the preprocessing module is running in a non-confidential computing environment or if the preprocessing module is tampered with, the running fails.

(3) Package the inference model and inference code as an inference module. The inference model refers to a model file including weight information of the inference model, and the inference code includes code for all other functions of the inference module, for example, a model loading and initialization module. The inference model and the inference code are plaintext files, which allow the authorized user to make secondary development based on service requirements.

(4) Distribute the packaged preprocessing module and the packaged inference module to the authorized user.

Figure 4:
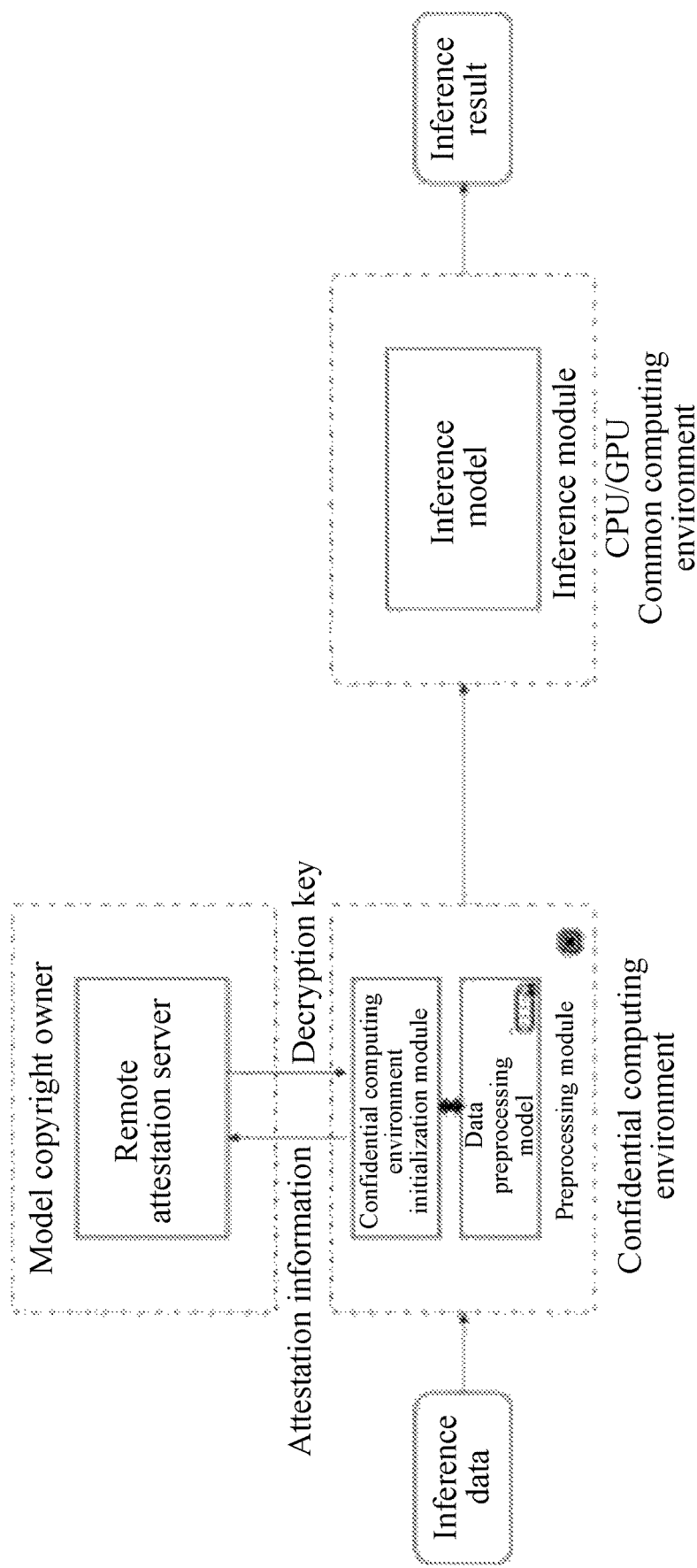
FIG. 4 is a schematic diagram of a model deployment and use method according to the present invention.
Figure 5:
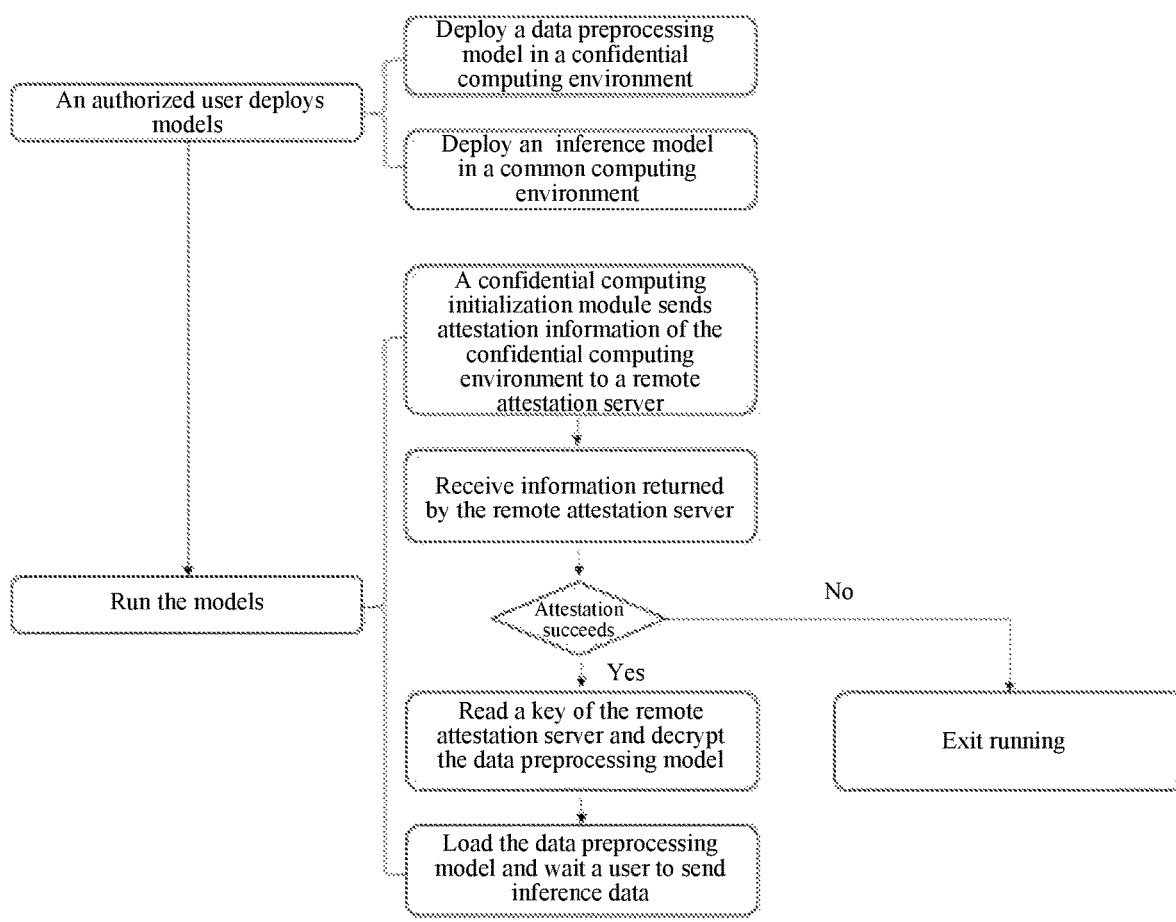
FIG. 5 is a work flowchart of a model authorization user end according to the present invention.

After receiving the preprocessing module and the inference module, the authorized user deploys and uses the models, as shown in FIG. 4 and FIG. 5:

(1) The authorized user deploys the preprocessing module to the confidential computing environment and deploys the inference module to a common computing environment.

(2) The confidential computing environment starts the preprocessing model, and sends attestation information of the confidential computing environment to a remote attestation server of the model copyright owner for attestation.

(3) The remote attestation server receives the attestation information sent by the confidential computing environment, verifies the attestation information according to a predetermined rule, and then sends a attestation result to the confidential computing environment, where the attestation information includes information used for attesting the security of the confidential computing environment and information used for attesting the integrity of the preprocessing module, which include MRSIGNER and MRENCLAVE, where the MRSIGNER is a confidential computing hardware metric issued by a confidential computing chip vendor and is used for attesting the security of a confidential computing platform; and the MRENCLAVE is a trusted zone code metric for the confidential computing platform and is used for attesting the integrity of code running in the confidential computing environment.

(4) The confidential computing environment receives the attestation result sent by the remote attestation server, if it is verified that the confidential computing environment and the code running in the confidential computing environment meet a rule requirement, the attestation result includes authorization information and a decryption key used for decrypting the data preprocessing model, and the authorization information includes information such as an authorization range, a use duration, and a quantity of times of invoking for a user; and if the attestation fails, the user cannot obtain the decryption key and the preprocessing module exits running.

(5) After the remote attestation server succeeds in attestation, the confidential computing environment initialization module in the preprocessing module reads the decryption key of the data preprocessing model, and decrypts the data preprocessing model, and after the model decryption is completed, the confidential computing environment initialization module loads the decrypted data preprocessing model.

(6) The data preprocessing model receives to-be-inferred data submitted by the user.

(7) The data preprocessing model preprocesses the to-be-inferred data, and sends the preprocessed data to the inference model.

(8) The inference model performs inference on the preprocessed data, and then sends an inference result to the authorized user.

Compared with an existing research solution, the solution introduces the confidential computing environment to protect the deep learning model, so as to provide only the authorized user with the high-precision inference result, and an unauthorized user cannot obtain the high-precision inference result. This solution has a faster inference speed than that in a solution in which model inference is performed in the confidential computing environment, and can protect the copyright security of the deep learning model to the greatest extent compared with a solution in which the inference model runs in only a CPU. The following is experimental data to prove the effectiveness of this solution:

Four deep learning models of ResNet-18, ResNet-50, MobileNetV2 and ShuffleNetV2 are trained, distributed, deployed, and used respectively.

Data sets of CIFAR-10 and CIFAR-100 are trained.

Baseline data is inference accuracy of a model that is not trained by using any protection method.

The comparison of inference accuracy of the models on the CIFAR-10 data set is shown in Table 1. The comparison of inference accuracy of the models on the CIFAR-100 data set is shown in Table 2. Baseline represents baseline data, Authorized User is inference accuracy tested by the authorized user, Unauthorized User is inference accuracy tested by the unauthorized user, and ACC represents accuracy.

TABLE 1

| CIFAR-10 | ACC | | | |
|---|---|---|---|---|
| | ResNet-18 | ResNet-50 | MobileNetV2 | ShuffleNetV2 |
| Baseline | 94.99 | 94.68 | 91.26 | 91.90 |
| Authorized User | 94.49 | 94.56 | 89.76 | 91.05 |
| Unauthorized User | 0.38 | 0.18 | 0.91 | 0.41 |

TABLE 2

| CIFAR-100 | ACC | | | |
|---|---|---|---|---|
| | ResNet-18 | ResNet-50 | MobileNetV2 | ShuffleNetV2 |
| Baseline | 77.78 | 77.72 | 68.88 | 70.86 |
| Authorized User | 76.55 | 76.83 | 67.42 | 70.60 |
| Unauthorized User | 2.83 | 2.56 | 2.31 | 2.72 |

TABLE 3

| Hardware | Time(milliseconds) | | | |
|---|---|---|---|---|
| | MobileNetV2 | SuffleNetV2 | ResNet-18 | ResNet-50 |
| Intel SGX | 192.27 | 351.51 | 826.20 | 4273.86 |
| CPU | 32.5 | 53.92 | 111.56 | 321.24 |
| Our(Intel SGX + CPU) | 56.47 | 77.89 | 135.53 | 345.21 |

The inference model runs in different computing environments, and a time consumed by performing inference on a single picture in the data set is shown in Table 3. The confidential computing environment used in the experiment is Intel SGX, and a CPU type is Intel Pentium SilverJ5005. [IntelSGX] in Table 3 is a time consumed by performing data inference in the IntelSGX environment for the inference model. [CPU] is a time consumed by performing data inference in the CPU for the inference model. Our[IntelSGX+CPU] is a sum of a time consumed by the data preprocessing model running in the IntelSGX environment and a time consumed by the inference model running in the CPU. It can be learned from the experimental results that this application has a faster inference speed than the solution in which model inference is performed in the confidential computing environment.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A method for protecting a deep learning model based on confidential computing, wherein a preprocessing module having a data preprocessing model and an inference module having an inference model are comprised, the data preprocessing model is encrypted and deployed into a confidential computing environment; and the method comprises:
S1: starting the preprocessing module in the confidential computing environment, and sending attestation information of the confidential computing environment to a model copyright owner server;
S2: receiving a attestation result returned by the model copyright owner server, and obtaining a decryption key for decrypting the data preprocessing model if the attestation result is correct, or exiting running if the attestation result is incorrect;
S3: decrypting the data preprocessing model by using the obtained decryption key, wherein the preprocessing module loads the decrypted data preprocessing model;
S4: preprocessing, by the data preprocessing model, to-be-inferred data submitted by an authorized user, and sending the preprocessed data to the inference model; and S5: performing, by the inference model, inference on the preprocessed data, and then sending an inference result to the authorized user;

wherein the preprocessing module and the inference module are distributed to the authorized user in advance and are deployed on an authorized user end, and the preprocessing module and the inference module are distributed to the authorized user in the following manners:

encrypting a trained data preprocessing model by using an encryption algorithm;

packaging the encrypted data preprocessing model and preprocessing code as the preprocessing module;

packaging a trained inference model and inference code as the inference module;

distributing the preprocessing module and the inference module to the authorized user; and deploying, by the authorized user, the preprocessing module to the confidential computing environment and deploying the inference module to a common computing environment; and wherein a training method of the data preprocessing model comprises:

running the data preprocessing model and a pretraining model, randomizing parameter information in the models, and combining loss functions of the data preprocessing model and the pretraining model;

processing a data set by using the data preprocessing model, and sending preprocessed data to the pretraining model;

sending unprocessed original data to the pre-training model; and training the pretraining model by using the original data and the preprocessed data, and selecting a combination of the data preprocessing model and the pretraining model with highest prediction accuracy.

2. The method for protecting a deep learning model based on confidential computing according to claim 1, wherein in step S5, before the inference model is used, a model parameter is first loaded and the model is initialized; and the preprocessing module comprises a confidential computing environment initialization module, and in step S1, the confidential computing environment initialization module is started in the confidential computing environment, and the confidential computing environment initialization module sends the attestation information of the confidential computing environment to the model copyright owner server; and in step S3, the confidential computing environment initialization module loads the decrypted data preprocessing model.

3. The method for protecting a deep learning model based on confidential computing according to claim 1, wherein the inference model is deployed in a common computing environment.

4. The method for protecting a deep learning model based on confidential computing according to claim 1, wherein in step S1 and step S2, the model copyright owner server verifies security of the confidential computing environment and integrity of the preprocessing module for the authorized user based on a remote attestation mechanism of the confidential computing environment, if a attestation result is safety and complete, the attestation result comprising the decryption key is returned to the confidential computing environment, and the attestation result is correct in this case; otherwise, the attestation result comprising no decryption key is returned, and the attestation result is incorrect in this case.

5. The method for protecting a deep learning model based on confidential computing according to claim 1, wherein a training method of the inference model comprises:

running the trained data preprocessing model and the pretraining model, and fixing model parameter information;

running the inference model and setting an optimizer;

processing the data set by using the data preprocessing model;

sending the preprocessed data to the pretraining model and the inference model respectively, and sending the unprocessed original data to the inference model; and training the inference model by using the original data and the preprocessed data, and optimizing a parameter of the inference model by using a prediction result of the pretraining model.

6. The method for protecting a deep learning model based on confidential computing according to claim 1, wherein the data preprocessing model and the pretraining model share one loss function during training.

7. The method for protecting a deep learning model based on confidential computing according to claim 5, wherein the inference model and the pretraining model have a same network structure.

* * * * *